(No Model.)
W. A. CHANDLER.
SPINDLE BEARING ADJUSTING DEVICE.
No. 535,318. Patented Mar. 5, 1895.
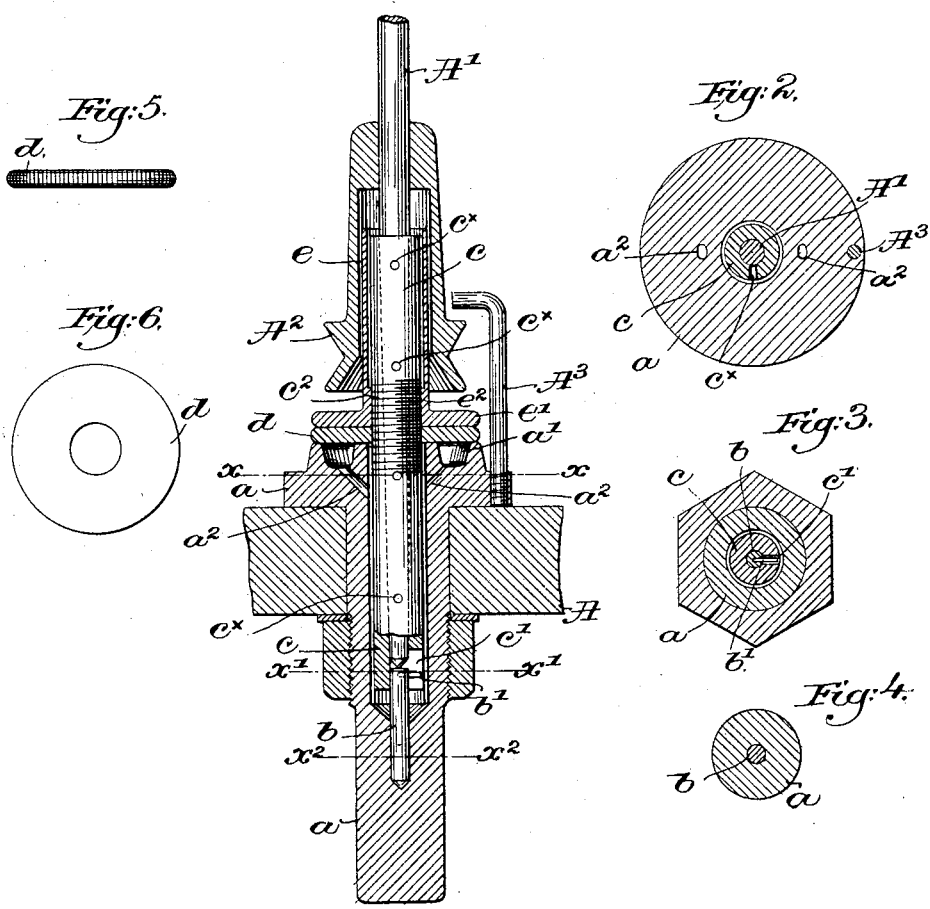
Witnesses.
Fred S. Greenleaf.
Thomas J. Drummond.
Inventor:
Walter A. Chandler.
by Crosby & Gregory.
attys.

UNITED STATES PATENT OFFICE.

WALTER A. CHANDLER, OF FALL RIVER, ASSIGNOR TO GEORGE DRAPER & SONS, OF HOPEDALE, MASSACHUSETTS.

SPINDLE-BEARING-ADJUSTING DEVICE.

SPECIFICATION forming part of Letters Patent No. 535,318, dated March 5, 1895.

Application filed January 3, 1895. Serial No. 533,703. (No model.)

*To all whom it may concern:*

Be it known that I, WALTER A. CHANDLER, of Fall River, county of Bristol, State of Massachusetts, have invented an Improvement in Spindle-Bearing-Adjusting Devices, of which the following description, in connection with the accompanying drawings, is a specification, like letters on the drawings representing like parts.

This invention relates to spinning and twisting machines having taper-bladed spindles running in correspondingly tapered bearings, wherein it is of the highest importance for the proper running of the spindle that its blade fit its bearing correctly, and it has for its object the production of means for providing the necessary adjustment of the parts to attain such end in a simple and expeditious manner.

In accordance with this invention the lateral bearing is exteriorly threaded intermediate its ends, and such threaded portion is engaged by a support loosely mounted on the supporting-case, rotation of the support raising or lowering the bearing, which is held from rotation by suitable means.

An oil reservoir is formed in the case, and the bearing support also forms a cover or top therefor, to prevent the admission of lint, &c., thereunto.

Figure 1 in vertical section and partially in elevation represents a spindle bearing provided with my novel adjusting device. Figs. 2, 3 and 4 are transverse sectional views thereof, on the lines $x-x$, $x'-x'$, and $x^2-x^2$, respectively. Fig. 5 is a side elevation; and Fig. 6, a plan view of the adjusting support detached.

The spindle rail A, taper-bladed spindle A′ having a sleeve whirl $A^2$, and the hook $A^3$ connected with the supporting case to prevent the spindle from rising, are and may be of usual construction.

The supporting-case $a$ having therein the fixed step $b$, surrounded by the lower end of the bolster bearing $c$ contained in said case, is shown as extended above the spindle rail A for a comparatively slight distance.

An oil reservoir $a'$, see Fig. 1, preferably an annular groove or depression formed in the top of the casing, is connected with its interior by suitable ducts $a^2$, through which the oil passes.

In this instance of my invention the bolster bearing $c$ is notched or slotted at its lower end at $c'$, and a stud or pin $b'$ fast in the step $b$ projects into the slot and holds the bearing from rotation.

The bolster bearing $c$ is exteriorly threaded intermediate its ends at $c^2$, and the bearing-support, herein shown as an annular disk $d$, is screwed onto said threaded portion and rests upon the top of the supporting-case $a$, as clearly shown in Fig. 1.

Rotation of the supporting disk in one or the other direction will raise or lower the bearing $c$, it being held from rotation as described, by the locking-pin $b'$, and the bearing will be vertically adjusted according to the amount of rotation given to the support.

The diameter of the disk $d$ is sufficient to extend over and effectually cover the oil reservoir $a'$, protecting the oil from lint, dirt, &c., the support thus having a two-fold purpose. As the disk is comparatively thin and consequently affords slight lateral support for the bearing above the supporting-case $a$, I have provided a tubular guard $e$, shown in Fig. 1, with a flanged base $e'$ to rest upon the support $d$, the hub $e^2$ being threaded internally to engage the threaded portion $c^2$ of the lateral bearing $c$. The threaded hub $e^2$ is long enough to give considerable support to the bearing, and when screwed against the disk $d$ the guard $e$ practically forms a rigid continuation thereof, the tubular portion of the guard preferably extending slightly above the top of the lateral bearing $c$.

Suitable openings $c^x$ in the bearing admit oil from the case into its tapered interior.

The support $d$ and the guard $e$ are readily accessible to the attendant, and when it is desired to vertically adjust the bearing, rotation of the support and guard, either singly or simultaneously, readily and quickly effects the required adjustment without interfering with the operation of the apparatus.

The bolster bearing is readily removed with its support by lifting the latter from its seat on the supporting-case.

As will be seen by an inspection of Fig. 1, the support and guard practically form an extension of the supporting-case above the spindle rail.

I claim—

1. The combination, with a supporting-case adapted to be fixed in a spindle rail, and an internally tapered bolster bearing in said case, said bearing being exteriorly threaded between its ends, of a support for and engaging the threaded portion of the bearing and resting on the top of the casing, rotation of the support adjusting the bolster bearing vertically, and means to prevent rotation of the said bearing, substantially as described.

2. The combination with a supporting-case adapted to be fixed in a spindle rail, and an internally tapered bolster bearing in said case, said bearing being exteriorly threaded between its ends, of a support for and engaging the threaded portion of the bearing and resting on the top of the casing, rotation of the support adjusting the bolster bearing vertically, a tubular guard surrounding the upper end of the bearing and resting on the support, and means to prevent rotation of the bearing, substantially as described.

3. The combination with a supporting-case adapted to be fixed in a spindle rail and recessed at its upper end to form an oil reservoir, an internally tapered bolster bearing in the case and exteriorly threaded between its ends, and means to prevent rotation of the bearing, of a support engaging the threaded portion of the bearing and resting on the casing to form a cover for the oil reservoir, rotation of said support adjusting the bolster bearing vertically, substantially as described.

4. A supporting-case adapted to be fixed in a spindle rail, a fixed step therein, and an internally tapered bolster bearing in the case and its slotted lower end surrounding the step, and a pin extended through the slot into the step, combined with a disk in engagement with an externally threaded portion of the bearing and resting on the casing, rotation of the disk adjusting the bearing vertically, and a tubular guard surrounding the upper end of and screwed upon the threaded portion of the bearing above the disk, substantially as described.

In testimony whereof I have signed my name to this specification in the presence of two subscribing witnesses.

WALTER A. CHANDLER.

Witnesses:
WILLIAM F. STOREY,
HENRY H. EARL.